US010149112B2

(12) United States Patent
Lee et al.

(10) Patent No.: US 10,149,112 B2
(45) Date of Patent: Dec. 4, 2018

(54) METHOD AND SYSTEM FOR PROVIDING INDOOR POSITIONING SERVICE

(71) Applicant: NAVER Business Platform Corporation, Seongnam-si (KR)

(72) Inventors: Ho Jin Lee, Seongnam-si (KR); Jaewook Yoo, Seongnam-si (KR); Tae Gyu Kang, Seongnam-si (KR); Sechun Oh, Seongnam-si (KR); Daewoong Kim, Seongnam-si (KR); Hee Su Shin, Seongnam-si (KR); Jungmin Kang, Seongnam-si (KR)

(73) Assignee: NAVER Business Platform Corporation, Seongnam-si (KR)

( * ) Notice: Subject to any disclaimer, the term of this patent is extended or adjusted under 35 U.S.C. 154(b) by 0 days.

(21) Appl. No.: 15/602,911

(22) Filed: May 23, 2017

(65) Prior Publication Data

US 2017/0265043 A1 Sep. 14, 2017

Related U.S. Application Data

(63) Continuation of application No. PCT/KR2016/000760, filed on Jan. 25, 2016.

(30) Foreign Application Priority Data

Jun. 26, 2015 (KR) .................. 10-2015-0091078

(51) Int. Cl.
*H04L 29/12* (2006.01)
*H04W 4/04* (2009.01)
(Continued)

(52) U.S. Cl.
CPC ........... *H04W 4/04* (2013.01); *H04L 61/6022* (2013.01); *H04W 4/33* (2018.02); *H04W 64/00* (2013.01); *H04W 88/08* (2013.01)

(58) Field of Classification Search
CPC ...... H04W 4/04; H04W 88/08; H04L 61/6022
See application file for complete search history.

(56) References Cited

U.S. PATENT DOCUMENTS

| 2003/0043073 A1 | 3/2003 | Gray et al. | |
|---|---|---|---|
| 2005/0020266 A1* | 1/2005 | Backes | H04L 47/125 455/436 |

(Continued)

FOREIGN PATENT DOCUMENTS

| KR | 10-2010-0041540 A | 4/2010 |
|---|---|---|
| KR | 10-2010-0108399 A | 10/2010 |

(Continued)

OTHER PUBLICATIONS

Taiwan Office Action dated May 31, 2017 by the Taiwan Patent Office corresponding to Taiwan patent application No. 105110274.

(Continued)

*Primary Examiner* — Qun Shen
(74) *Attorney, Agent, or Firm* — Greer Burns & Crain Ltd.

(57) ABSTRACT

Disclosed are a method and a system for providing an indoor positioning service. A method for providing an indoor positioning service comprises receiving a request to provide an indoor positioning service from a user terminal; receiving, in response to the request, information for wireless access points located near the user terminal; calculating the similarity between the items of information, and accuracy of the locations of the wireless access points on the basis of the received information for the wireless access points and information for the wireless access point collected from each point positioned inside the building; and determining the current location of the user terminal on the basis of the similarity and accuracy of the location.

16 Claims, 9 Drawing Sheets

(51) Int. Cl.
     *H04W 64/00*      (2009.01)
     *H04W 4/33*      (2018.01)
     *H04W 88/08*      (2009.01)

(56) References Cited

U.S. PATENT DOCUMENTS

| | | | | |
|---|---|---|---|---|
| 2008/0176583 A1* | 7/2008 | Brachet | ................ | G01S 5/0236 |
| | | | | 455/456.3 |
| 2009/0252138 A1 | 10/2009 | Alizadeh-Shabdiz et al. | | |
| 2012/0315918 A1* | 12/2012 | Kadous | ................ | H04W 4/021 |
| | | | | 455/456.1 |
| 2013/0170382 A1* | 7/2013 | Kang | ................ | H04W 64/00 |
| | | | | 370/252 |
| 2013/0267251 A1* | 10/2013 | Khorashadi | ........... | H04W 4/023 |
| | | | | 455/456.3 |

FOREIGN PATENT DOCUMENTS

| | | |
|---|---|---|
| KR | 10-2012-0083354 A | 7/2012 |
| KR | 10-2014-0019851 | 2/2014 |
| KR | 10-2014-0019851 A | 2/2014 |
| KR | 10-2015-0069476 | 6/2015 |
| KR | 10-2015-0069476 A | 6/2015 |
| TW | 1318691 B | 12/2009 |
| TW | 1391699 B | 4/2013 |

OTHER PUBLICATIONS

Int'l. Search Report issued in Int'l. App. No. PCT/KR2016/000760, dated Jul. 6, 2016.

\* cited by examiner

METHOD AND SYSTEM FOR PROVIDING INDOOR POSITIONING SERVICE

CROSS-REFERENCE TO RELATED APPLICATIONS

This application is a continuation of International Application No. PCT/KR2016/000760, filed Jan. 25, 2016.

BACKGROUND OF INVENTION

One or more example embodiments relate to technology for providing an indoor positioning system that determines a current location of a user terminal moving inside a building.

RELATED ART

Currently, with the spread of smartphones and the development of mobile communication networks, users may freely utilize a variety of information and services without a restriction on time and space.

Among services being provided to users, a location-based service (LBS) is applied to a notification of an arrival time of bus/subway, navigation, and the like, and may provide users with information suitable for various purposes.

In addition, as transportation facilities and amenities are developed, a subway station and a bus terminal are connected to a complex shopping center, a department store, etc., where a cinema, shops for shopping, a bookstore, etc., are gathered. As a result, a scale of a building is becoming huge and a user may not easily find a way to a desired destination without viewing an inside map of the building. Accordingly, a service that provides an indoor location of a user inside the building is provided. For example, Korean Patent Publication No. 10-2010-0041540 discloses an indoor positioning method for verifying an indoor location of a terminal using a global positioning system (GPS) satellite signal, an external antenna, and outdoor/indoor mapping information.

SUMMARY OF THE INVENTION

One or more example embodiments of the present invention provide an indoor positioning service providing method and system that accurately provides an indoor location of a user terminal moving between floors inside a building or in a shadowed area, for example, a parking lot, stairs, etc., in which a wireless access point is not installed.

One or more example embodiments also provide an indoor positioning service providing method and system that accurately provide an indoor location of a user terminal in various types of building structures, for example, a building with an open ceiling, buildings connected in a square, a glass-walled building, and the like.

According to one aspect, there is provided an indoor positioning service providing method performed by an indoor positioning service providing system to determine a current location of a user terminal located inside a building, the method including receiving a request for providing an indoor positioning service from the user terminal; receiving information about adjacent wireless access points of the user terminal in response to the request; calculating a similarity between information and another piece of information and a location accuracy of a wireless access point based on the received information about the adjacent wireless access points and information about wireless access points collected from each region disposed inside the building; and determining the current location of the user terminal based on the similarity and the location accuracy.

According to another aspect, there is provided an indoor positioning service providing system to determine a current location of a user terminal located inside a building, the system including an information receiver configured to receive information about adjacent wireless access points of the user terminal, in response to receiving a request for providing an indoor positioning service from the user terminal; a calculator configured to calculate a similarity between information and another piece of information and a location accuracy of a wireless access point based on the received information about the adjacent wireless access points and information about wireless access points collected from each region disposed inside the building; and a location determiner configured to determine the current location of the user terminal based on the similarity and the location accuracy.

According to another aspect, there is provided a non-transitory computer-readable medium storing an instruction to control a computer system to provide an indoor positioning service. The instruction controls the computer system by a method including receiving a request for providing an indoor positioning service from the user terminal; receiving information about adjacent wireless access points of the user terminal in response to the request; calculating a similarity between information and another piece of information and a location accuracy of a wireless access point based on the received information about the adjacent wireless access points and information about wireless access points collected from each region disposed inside the building; and determining the current location of the user terminal based on the similarity and the location accuracy.

According to another aspect, there is provided a file distribution system to distribute an installation file for installing an application on a user terminal, including an installation file manager configured to store and manage the installation file; and an installation file transmitter configured to transmit the installation file to the user terminal in response to a request from the user terminal. The application controls the user terminal to receive a current location of the user terminal inside a building based on a similarity between information and another piece of information and a location accuracy, which are calculated based on information about adjacent wireless access points of the user terminal and information about wireless access points collected from each region disposed inside the building.

According to example embodiments, it is possible to reduce an indoor positioning error by accurately determining an indoor location of a user terminal moving between floors inside a building or in a shadowed area, for example, a parking lot, stairs, etc., in which a wireless access point is not installed.

According to example embodiments, it is possible to accurately provide an indoor location of a user terminal in various types of building structures, such as a building with an open ceiling, buildings connected in a square, a glass-walled building, and the like.

DETAILED DESCRIPTION OF THE INVENTION

Hereinafter, example embodiments will be described with reference to the accompanying drawings.

The example embodiments relate to an indoor positioning service, and more particularly, to a method and system for providing an indoor positioning service of a user terminal by further considering the location accuracy in addition to the similarity between wireless access points (APs) when performing fingerprint-based indoor positioning.

The indoor positioning service generally used in daily lives provides information about the location of a user terminal based on an indoor map of a building and may further measure the location of the user terminal in a connecting passage between buildings, an outdoor square, a rooftop, outdoor facilities (e.g., an outdoor garden, an outdoor newsstand, an open-air cafe, etc.,) around the building, and the like, and may provide the measured location of the user terminal. In particular, the example embodiments relate to an indoor positioning service providing method and system that measure the current location of a user terminal when the user terminal is moving in a place in which a ceiling in a building is open, or an AP is not installed, such as an escalator, stairs, etc., or when the user terminal is moving between floors very fast in an elevator, and may provide the measured location of the user terminal.

Herein, the term "fingerprint point (FP)" denotes a virtual region designated inside a building for indoor positioning. With respect to each FP, identification information (ID) of an FP, coordinate information (latitudinal and longitudinal coordinate values) of the FP, a media access control (MAC) address of an adjacent wireless AP of the FP, a signal strength of the adjacent wireless AP of the FP, etc., may be stored in advance in a database. For example, the respective FPs may be virtually aligned at the same intervals along a passage, for example, a corridor, inside the building. The signal strength of a wireless AP may indicate a received signal strength indicator (RSSI) value of the wireless AP measured in advance at a corresponding FP.

The wireless AP may represent a wireless fidelity (WiFi) AP. Information about an adjacent wireless AP scanned at the user terminal may include a MAC address of an AP, a signal strength of the AP, and the like. Hereinafter, although the WiFi AP is described as a representative example of the wireless AP, it is provided as an example only. In addition to the WiFi AP, a wireless AP that provides a near-field wireless communication service may be used.

Here, the term "location accuracy denotes a standard used to determine a matching level between the current location of the user terminal determined through FP-based indoor positioning and an actual location of the user terminal, and may be calculated based on at least one of the number of APs and the similarity between signal strengths.

Figure 1:
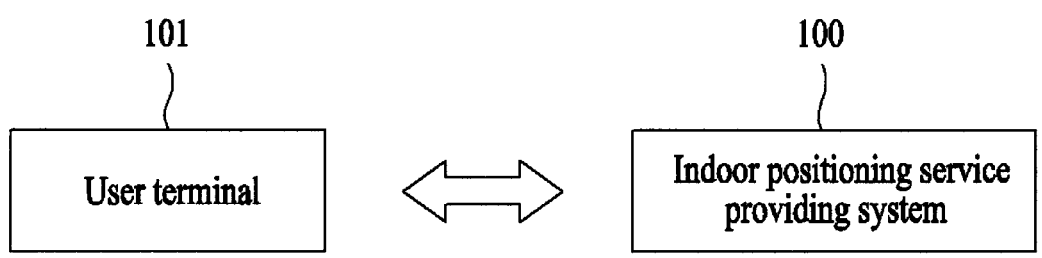
FIG. 1 illustrates a relationship between a user terminal and an indoor positioning service providing system according to an example embodiment.

FIG. 1 illustrates a relationship between a user terminal and an indoor positioning service providing system according to an example embodiment. FIG. 1 illustrates an indoor positioning service providing system 100 and a user terminal 101. Referring to FIG. 1, an indicator with arrow heads may indicate that data may be transmitted and received between the indoor positioning service providing system 100 and the user terminal 101 over a wired/wireless network.

The user terminal 101 may refer to any type of terminal devices, for example, a personal computer, a smartphone, a tablet, a laptop computer, and the like, capable of connecting to a website/mobile site associated with the indoor positioning service providing system 100, and installing and executing a service exclusive application (hereinafter, referred to as a service app). Here, the user terminal 101 may perform the overall service operation, such as service screen configuration, data input, data transmission and reception, data storage, and the like, through connection to the website/mobile site or under control of the service app.

The indoor positioning service providing system 100 functions as a service platform that measures the location of the user terminal 101 located inside a building and provides a location-based service based on the measured location with respect to the user terminal 101 that is a client. In particular, to provide an indoor positioning and location-based service to the user terminal 101, the indoor positioning service providing system 100 may provide a user interface for receiving a user interaction to the user terminal 101.

The indoor positioning service providing system 100 may be configured in a form of an application on the user terminal 101, and without being limited thereto, may be configured to be included in a service platform that provides a my-location verification service, a tracking service, a find-way service, a map search service, etc., based on a current location of the user terminal in a client-server environment.

Figure 2:
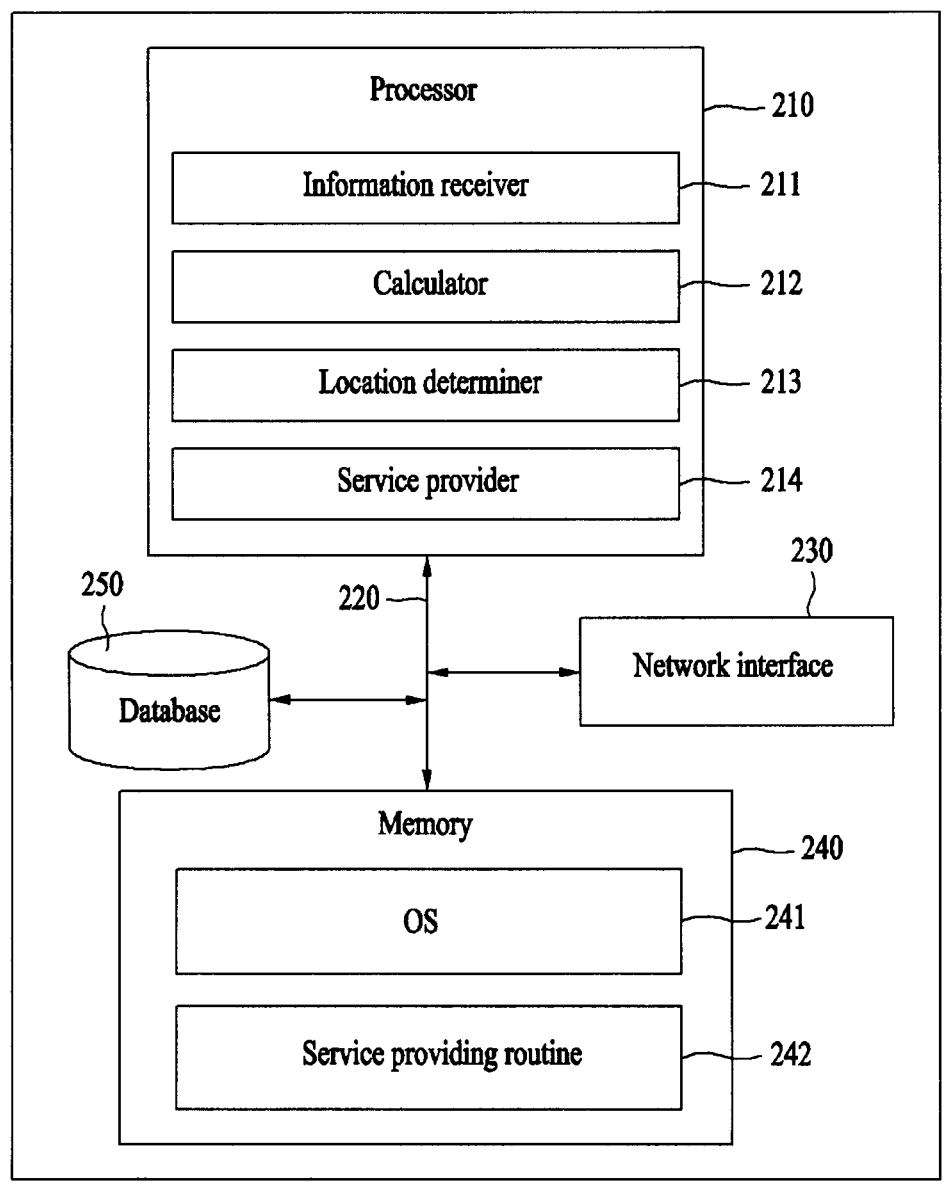
FIG. 2 is a block diagram illustrating a configuration of an indoor positioning service providing system according to an example embodiment.
Figure 3:
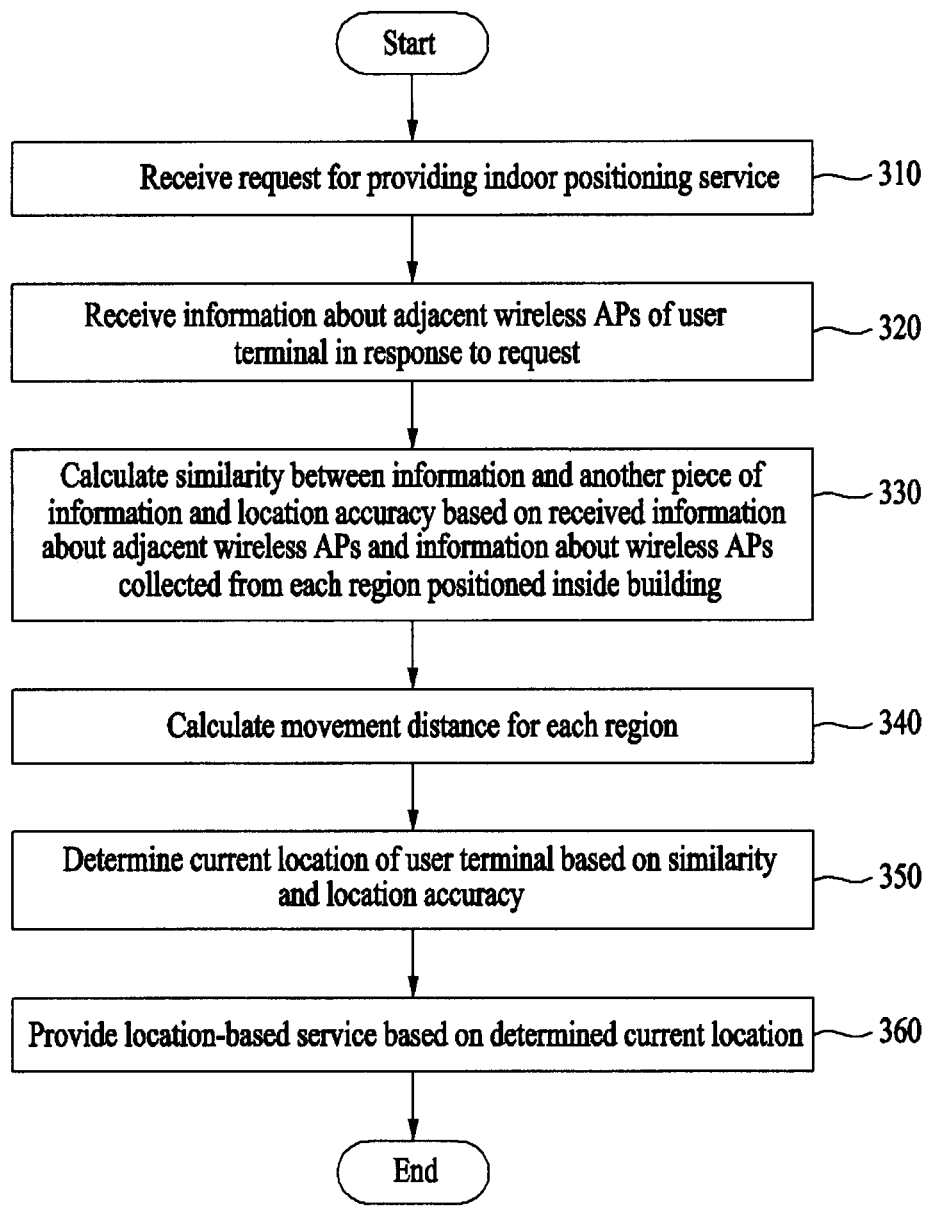
FIG. 3 is a flowchart illustrating an indoor positioning service providing method according to an example embodiment.

FIG. 2 is a block diagram illustrating a configuration of an indoor positioning service providing system according to an example embodiment, and FIG. 3 is a flowchart illustrating an indoor positioning service providing method according to an example embodiment.

Referring to FIG. 2, an indoor positioning service providing system 200 according to the example embodiment includes a processor 210, a bus 220, a network interface 230, a memory 240, and a database 250. The memory 240 includes an operating system (OS) 241 and a service providing routine 242. The processor 210 includes an information receiver 211, a calculator 212, a location determiner 213, and a service provider 214. According to other example embodiments, the indoor positioning service providing system 200 may include a greater number of components than the number of components shown in FIG. 2. However, there is no need to clearly illustrate many components according to the related art. For example, the indoor positioning service providing system 200 may include other components, such as a display or a transceiver.

The memory 240 may include a permanent mass storage device, such as random access memory (RAM), read only memory (ROM), or a disk drive, as a computer-readable storage medium. Also, program codes for the OS 241 and the service providing routine 242 may be stored in the memory 240. Such software components may be loaded from another computer-readable storage medium separate from the memory 240 using a drive mechanism (not shown). The other computer-readable storage medium may include, for example, a floppy drive, a disk, a tape, a DVD/CD-ROM drive, a memory card, etc. Software components may be loaded to the memory 240 through the network interface 230 instead of the computer-readable storage medium.

The bus 220 enables communication and data transmission between the components of the indoor positioning service providing system 200. The bus 220 may be configured using a high-speed serial bus, a parallel bus, a storage area network (SAN), and/or another appropriate communication technology.

The network interface 230 may be a computer hardware element for connecting the indoor positioning service providing system 200 to the computer network. The network interface 230 may connect the indoor positioning service providing system 200 to the computer network through a wireless and/or wired connection.

The database 250 serves to store and maintain any information required to provide a service for determining the location of the user terminal 101 and to provide a location-based service based on the determined location of the user terminal. In particular, the database 250 may be configured in advance based on information about wireless APs collected from each region inside a building when constructing an indoor map of the building. Here, each region may represent each of FPs virtually disposed at preset intervals inside the building.

For example, when constructing the indoor map of a building, an indoor map constructing apparatus (not shown) may collect a plurality of pieces of information required to generate the indoor map while moving inside the building. Here, the indoor map construction apparatus (not shown) may collect information about adjacent wireless APs of a corresponding FP from each FP inside the building. The collected plurality of pieces of information may be stored, maintained, and managed in the database 250. Here, information about the wireless APs collected from each FP may be collected for each floor inside the building. For example, as shown in the following Table 1, information about the wireless APs collected from each FP may include at least one of identification information (ID) of each FP, coordinate information (latitudinal and longitudinal global positioning system (GPS) coordinate values) of each FP, a MAC address of each adjacent wireless AP of each FP, and a signal strength of each adjacent wireless AP of each FP. The collected plurality of pieces of information may be matched to each other and stored in the database 250.

TABLE 1

|  | FP1 | FP2 | FP3 |
|---|---|---|---|
| Latitude | 37.385350 | 37.385337 | 37.385365 |
| Longitude | 127.121150 | 127.121378 | 127.121585 |
| MAC address of AP1 | −40 | −50 | −60 |
| MAC address of AP2 | −35 | −37 | −40 |

TABLE 1-continued

|  | FP1 | FP2 | FP3 |
|---|---|---|---|
| MAC address of AP3 | −45 | −50 | −55 |
| MAC address of AP4 | −70 | −63 | −55 |
| MAC address of AP5 | −75 | −65 | −55 |
| MAC address of AP6 | −90 | −75 | −60 |

Referring to Table 1, the values −40, −35, −45, −70, −75, and −90 indicate the signal strength of AP1, the signal strength of AP2, the signal strength of AP3, the signal strength of AP4, the signal strength of AP5, and the signal strength of AP6, respectively, which are collected from FP1. Signal strengths of AP1, AP2, AP3, AP4, AP5, and AP6 collected from each of FP2 and FP3 may be verified from Table 1.

The database 250 may be included in the indoor positioning service providing system 200 and, if necessary, may be included in the user terminal 101 or may be included in both of the indoor positioning service providing system 200 and the user terminal 101. The database 250 may be present as an external database constructed on another system separate from the indoor positioning service providing system 200.

The processor 210 may be configured to process computer-readable instructions of a computer program by performing a basic arithmetic operation, a logic operation, and an input/output operation of the indoor positioning service providing system 200. The computer-readable instructions may be provided from the memory 240 or the network interface 230 to the processor 210 through the bus 220. The processor 210 may be configured to execute program codes for the information receiver 211, the calculator 212, the location determiner 213, and the service provider 214. The program codes may be stored in a storage device, such as the memory 240.

Figure 4:
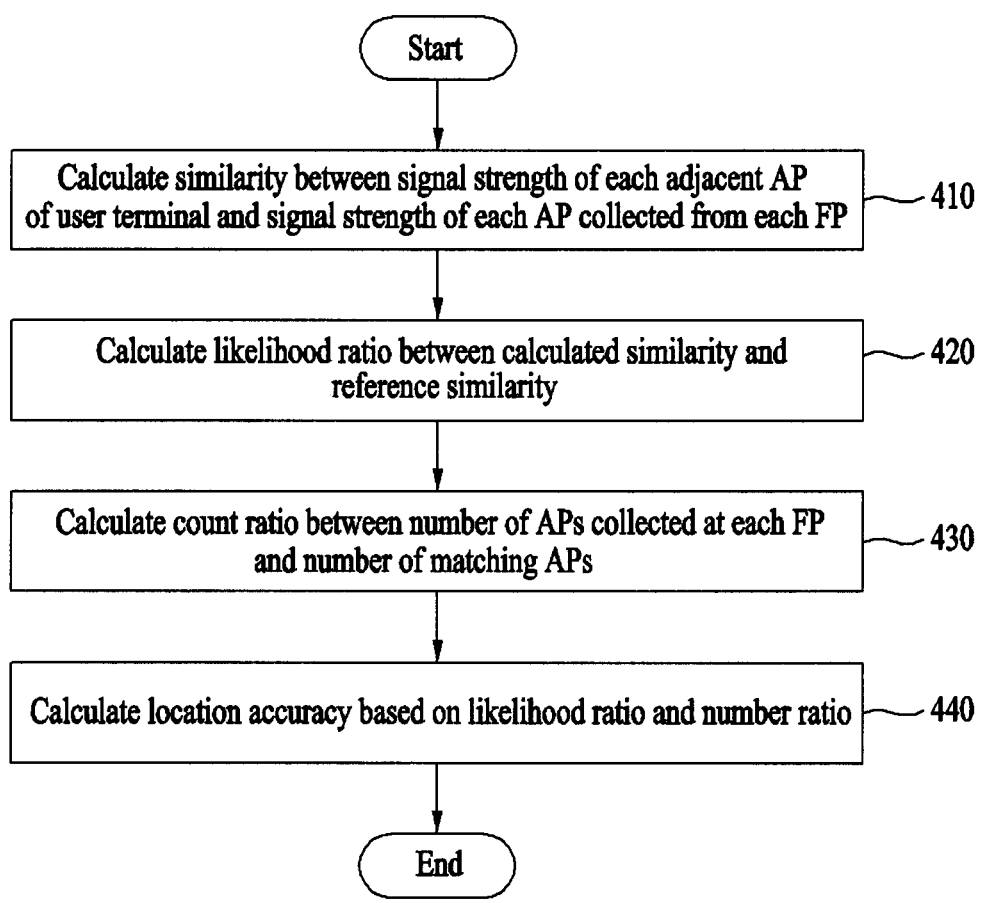
FIG. 4 is a flowchart illustrating a process of calculating the location accuracy and the similarity between signal strengths according to an example embodiment.

The information receiver 211, the calculator 212, the location determiner 213, and the service provider 214 may be configured to perform operations 310 through 360 of FIG. 3 and operations 410 through 440 of FIG. 4. Hereinafter, a configuration of determining the current location of the user terminal 101 and providing the determined current location of the user terminal in response to a request from the user terminal 101 in a state in which a database is constructed in advance when constructing an indoor map of a building will be described with reference to FIG. 3.

In operation 310, the information receiver 211 receives a request for providing an indoor positioning service from the user terminal 101 through a user interface that provides a user interaction between the indoor positioning service providing system 200 and the user terminal 101.

For example, the information receiver 211 may receive a request for providing the indoor positioning service in response to an execution of a service app installed on the user terminal 101 or in response to an execution of an app associated with the indoor positioning service or an app associated with a location-based service, etc.

In operation 320, in response to the request for providing the indoor positioning service, the information receiver 211 receives information about adjacent wireless APs near the user terminal 101.

For example, the information receiver 211 may receive, from the user terminal 101, information about wireless APs collected at the user terminal 101 from the adjacent wireless APs of the FPs located inside a building. The wireless APs may represent a WiFi AP, and information about an adjacent wireless AP of the user terminal 101, i.e., a wireless AP adjacent or nearest to the user terminal, may include a MAC address of the wireless AP, a signal strength of the wireless AP scanned at the user terminal 101, and the like. The signal strength of the wireless AP scanned at the user terminal 101 may indicate an RSSI value.

In operation 330, the calculator 212 calculates a similarity between information and another piece of information and a location accuracy based on the received information about the adjacent wireless APs of the user terminal 101 and information about wireless APs collected from each region, for example, each FP.

For example, the calculator 212 may determine a region (FP) corresponding to a MAC address that matches the MAC address of the adjacent wireless AP of the user terminal 101, with respect to information about wireless APs for each region (FP) stored in the database 250. The calculator 212 may generate a candidate list based on regions corresponding to the matching MAC address. The calculator 212 may calculate a similarity between a signal strength of a matching AP of each region (FP) and a signal strength of an adjacent AP of the user terminal 101 with respect to regions (FPs) included in the candidate list. The calculator 212 may calculate a location accuracy based on the calculated similarity and a reference similarity preset for each region (FP). Here, the reference similarity indicates the score that is preset assuming a case in which the user terminal 101 is actually accurately located at an FP virtually disposed inside the building, and may have a different value for each FP.

With respect to each of regions (FPs) included in the candidate list, the calculator 212 may calculate a number of APs that match MAC address(es) of adjacent AP(s) of the user terminal 101 among matching APs for each region. The calculator 212 may calculate the location accuracy based on the number of matching APs and a total number of matching APs for each region. Here, the calculator 212 may calculate the location accuracy by using all of the similarity between the signal strengths and the number of matching APs. A configuration of calculating the location accuracy and the similarity will be described with reference to FIG. 4.

In operation 340, the calculator 212 further calculates a movement distance for each of the regions (FPs) included in the candidate list, in addition to calculating the similarity and the location accuracy.

For example, the calculator 212 may calculate a movement distance from a previous region to each of the regions (FPs) included in the candidate list, based on coordinate information of each of the regions included in the candidate list and coordinate information of a just-previously positioned previous region, for example, coordinate information of a previous FP. For example, if FP2, FP3, and FP4 are included in the candidate list and a previously positioned region is FP1, the calculator 212 may calculate each of a movement distance between FP1 and FP2, a movement distance between FP1 and FP3, and a movement distance between FP1 and FP4.

In operation 350, the location determiner 213 determines the current location of the user terminal 101 based on at least one of the calculated similarity, location accuracy, and movement distance.

For example, the location determiner 213 may sort the regions (FPs) included in the candidate list in descending order of the calculated similarity between signal strengths. Here, if a difference value between similarities of the regions is less than or equal to a preset reference difference value and thus, regarded to be insignificant, the location determiner 213 may determine the current location of the user terminal 101 based on the location accuracy and the movement distance instead of determining a region corresponding to a highest similarity as the current location of the user terminal. For example, the location determiner 213 may determine a region corresponding to a highest location accuracy and a shortest movement distance as the current location of the user terminal 101.

Here, if a difference value between location accuracies of the regions included in the candidate list is also less than or equal to a preset accuracy lower limit difference value and thus, regarded to be insignificant, that is, if the candidates have similar location accuracies, the location determiner 213 may determine the current location of the user terminal 101 by assigning a weight to each FP based on a movement distance that is calculated based on previously positioned location information. For example, the location determiner 213 may assign a relatively high weight to a region corresponding to a relatively short movement distance among the regions included in the candidate list. The location determiner 213 may determine a region corresponding to a shortest movement distance as the current location of the user terminal 101. That is, if the difference value between the similarities and the difference value between the location accuracies are both insignificant, the location determiner 213 may determine the region corresponding to the shortest movement distance as the current location of the user terminal 101. In addition, the location determiner 213 may determine the current location of the user terminal 101 using a variety of methods based on the similarity, the location accuracy, and the movement distance. An operation of determining the current location of the user terminal 101 will be further described with reference to FIGS. 5 through 8.

In operation 360, the service provider 214 provides various types of location-based services based on the determined current location of the user terminal 101. For example, the current location of the user terminal 101 may be pinned on the indoor map of the building in which the user terminal is located, based on the current location of the user terminal provided from the service provider 214 on a screen of the user terminal 101. In addition, the service provider 214 may provide a find-way service, at tracking service, and the like, inside the building, based on the determined current location of the user terminal 101.

FIG. 4 is a flowchart illustrating a process of calculating location accuracy and similarity between signal strengths according to an example embodiment.

Referring to FIG. 4, in operation 410, the calculator 212 calculates the similarity based on a difference between a signal strength of each adjacent AP of the user terminal 101 and a signal strength of each AP collected from each of FPs included in a candidate list. For example, the calculator 212 may calculate the similarity according to Equation 1.

$$\mathrm{Sim}(x)=(100-|(F.\mathrm{AP1}-C.\mathrm{AP1})|)*f(C.\mathrm{AP1})+(100-|(F.\mathrm{AP2}-C.\mathrm{AP2})|)*f(C.\mathrm{AP2})\ldots(100-|(F.\mathrm{APn}-C.\mathrm{APn})|)*f(C.\mathrm{APn}) \quad \text{[Equation 1]}$$

In Equation 1, F.AP denotes a signal strength of each AP collected from a corresponding FP, C.AP denotes a signal strength of each adjacent AP of the user collected at the user terminal 101, and f(x) denotes a weight function.

For example, if signal strengths of AP1, AP2, AP3, AP4, AP5, and AP6 collected at the user terminal 101 are −45, −40, −50, −60, −65, and −80, and signal strengths of APs collected from each of FP1, FP2, and FP3 included in the candidate list are as shown in Table 1, a signal strength similarity (Sim(FP1)) between the user terminal and FP1, a signal strength similarity (Sim(FP2)) between the user terminal and FP2, and a signal strength similarity (Sim(FP3)) between the user terminal and FP3 may be represented as shown in Equation 2.

$$Sim(FP1)=(100-|(-40)-(-45)|)*(11)+(100-|(-35)-(-40)|)*13)+(100-|(-45)-(-50)|)*(8)+(100-|(-70)-(-60)|)*(5)+(100-|(-75)-(-65)|)*3)+(100-|(-90)-(-80)|)*(1)=3850,$$

$$Sim(FP2)=(100-|(-50)-(-45)|)*(11)+(100-|(-37)-(-40)|)*(13)+(100-|(-50)-(-50)|)*(8)+(100-|(-63)-(-60)|)*(5)+(100-|(-65)-(-65)|)*3)+(100-|(-75)-(-80)|)*(1)=3986,$$

$$Sim(FP3)==(100-|(-60)-(-45)|)*(11)+(100-|(-40)-(-40)|)*(13)+(100-|(-55)-(-50)|)*(8)+(100-|(-55)-(-60)|)*(5)+(100-|(-55)-(-65)|)*3)+(100-|(-60)-(-80)|)*(1)=3820 \quad [\text{Equation 2}]$$

In operation 420, the calculator 212 calculates a ratio, that is, a likelihood ratio, between the calculated similarity and a reference similarity preset for each FP. For example, if a reference similarity is preset as 5000 for FP1, set as 10000 for FP2, and set as 8000 for FP3, the calculator 212 may calculate a likelihood ratio at FP1 as (3850/5000)*100=77, a likelihood ratio at FP2 as (3986/10000)*100=39.86, and a likelihood ratio at FP3 as (3820/8000)*100=47.75. The likelihood ratio is a parameter used to calculate the location accuracy. Although a similarity of FP2 has the highest score, a location accuracy of FP2 may be highly likely to be low. Accordingly, instead of determining the current location of the user terminal 101 using the similarity alone, the location determiner 213 may determine the current location of the user terminal by further considering the location accuracy. Here, the calculator 212 may further use the number of matching APs in addition to the similarity to calculate the location accuracy.

In operation 430, the calculator 212 calculates a number of APs that match AP(s) collected at the user terminal 101 among APs collected from each of FPs included in the candidate list. For example, if FP1, FP2, and FP3 are included in the candidate list, and signal strengths of AP1, AP2, AP3, AP4, AP5, and AP6 are collected at FP1, signal strengths of FP3 FP4, FP5, FP6, and AP7 are collected at FP2, and signal strengths of AP3, AP4, AP5, AP6, AP7, and AP8 are collected at FP3 and thereby constructed in advance in a database, and AP1, AP2, AP3, AP10, and AP20 are collected at the user terminal 101, the calculator 212 may calculate the number of matching APs at FP1 as 3, the number of matching APs at FP2 as 1, and the number of matching APs at FP3 as 1. The calculator 212 may calculate, for each FP, a ratio, that is, a count ratio, between the number of matching APs and the total number of APs collected from each FP. For example, the calculator 212 may calculate the count ratios at FP1, FP2, and FP3 as 3/6*100, 1/ 5*100, and 1/ 6*100, respectively. Although the count ratio is described as an example, it is provided as an example only. The calculated count ratio and likelihood ratio may have similar values.

In operation 440, the calculator 212 calculates the location accuracy for each of the FPs included in the candidate list, based on the likelihood ratio that is calculated using the similarity and the count ratio that is calculated using the number of matching APs. For example, the calculator 212 may calculate the location accuracy using an average value of the likelihood ratio and the count ratio. The location determiner 213 may calculate the current location of the user terminal 101 based on the calculated location accuracy.

Figure 5:
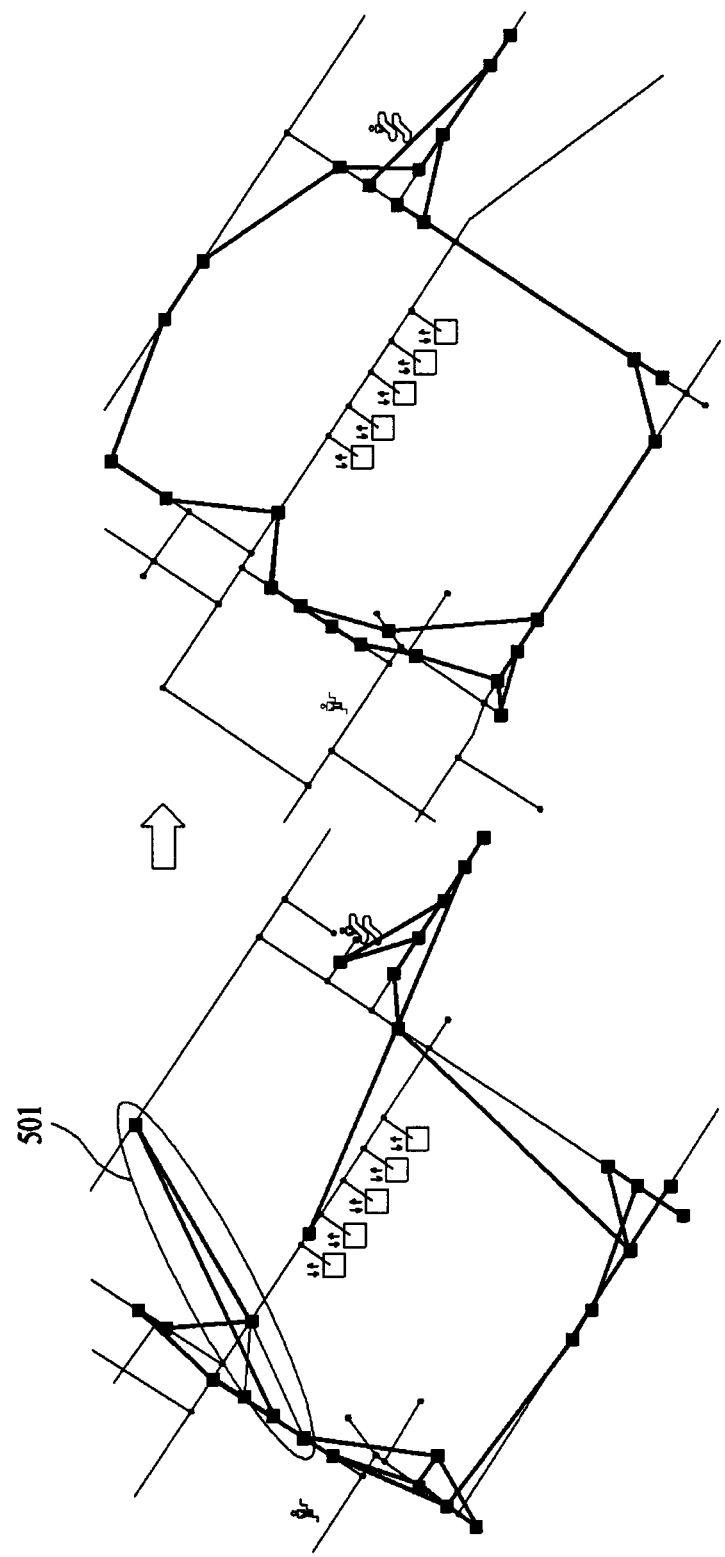
FIG. 5 illustrates a diagram illustrating an operation of determining the current location of a user terminal according to an example embodiment.

FIG. 5 illustrates an example of an operation of determining a current location of the user terminal 101 according to an example embodiment. FIG. 5 illustrates a structure of a building with an open ceiling.

Referring to FIG. 5, if the ceiling of the building is open, a signal strength of an AP located at the opposite side of the floor and a signal strength of an AP located on another floor may be collected at the user terminal 101. For example, although the user terminal 101 is located on the 2nd floor, signal strengths of APs present on the 3rd floor and the fourth floor or the signal strength 501 of an AP present on the opposite side of the 2nd floor may be collected at the user terminal 101. That is, in a building with an open ceiling, a building in which an opening is formed to pass through a plurality of floors so that a person may view a lower floor from an upper floor, or a building of which floor/ceiling is made of glass, signals collected at the user terminal 101 located on the 2nd floor may include signals of APs located on another floor or on the opposite side of the 2nd floor, as well as signals collected from adjacent APs based on the current location of the user terminal 101. Alternatively, signal jittering may occur between floors.

Here, if signal strengths of APs located on the 3rd floor and the fourth floor or signal strengths of APs located on the opposite side of the floor have a relatively high similarity, an erroneous current location of the user terminal 101 may be provided and thus, a location accuracy and a movement distance may need to be further considered.

For example, the location determiner 213 may sort the FPs included in the candidate list in descending order of the similarities that are calculated based on signal strengths of APs collected from each of the FPs. Here, if an FP has the highest similarity, however, has a location accuracy less than or equal to a preset reference accuracy, the location determiner 213 may exclude the corresponding FP from the candidate list. If FP1, FP2 , FP3, and FP4 are included in the candidate list, similarities of FP1, FP2, FP3, and FP4 are 79, 73, 65, and 55, respectively, location accuracies of FP1, FP2, FP3, and FP4 are 35, 64, 57, and 51, respectively, and a reference accuracy is 40, the location determiner 213 may exclude FP1 corresponding to the highest similarity from the candidate list. Here, if a movement distance of FP2 is less than those of FP3 and FP4, the location determiner 213 may determine FP2 corresponding to the shortest movement distance and the highest location accuracy as the current location of the user terminal 101. If an FP has a highest similarity, however, has a significantly low location accuracy, the location determiner 213 may not determine the corresponding FP as the current location of the user terminal 101.

As another example, if an FP has the lowest similarity or a significantly low similarity compared to the highest similarity, however, has a significantly high location accuracy that is greater than or equal to a preset upper limit accuracy, the location determiner 213 may determine the FP corresponding to a highest location accuracy as the current location of the user terminal 101.

Figure 6:
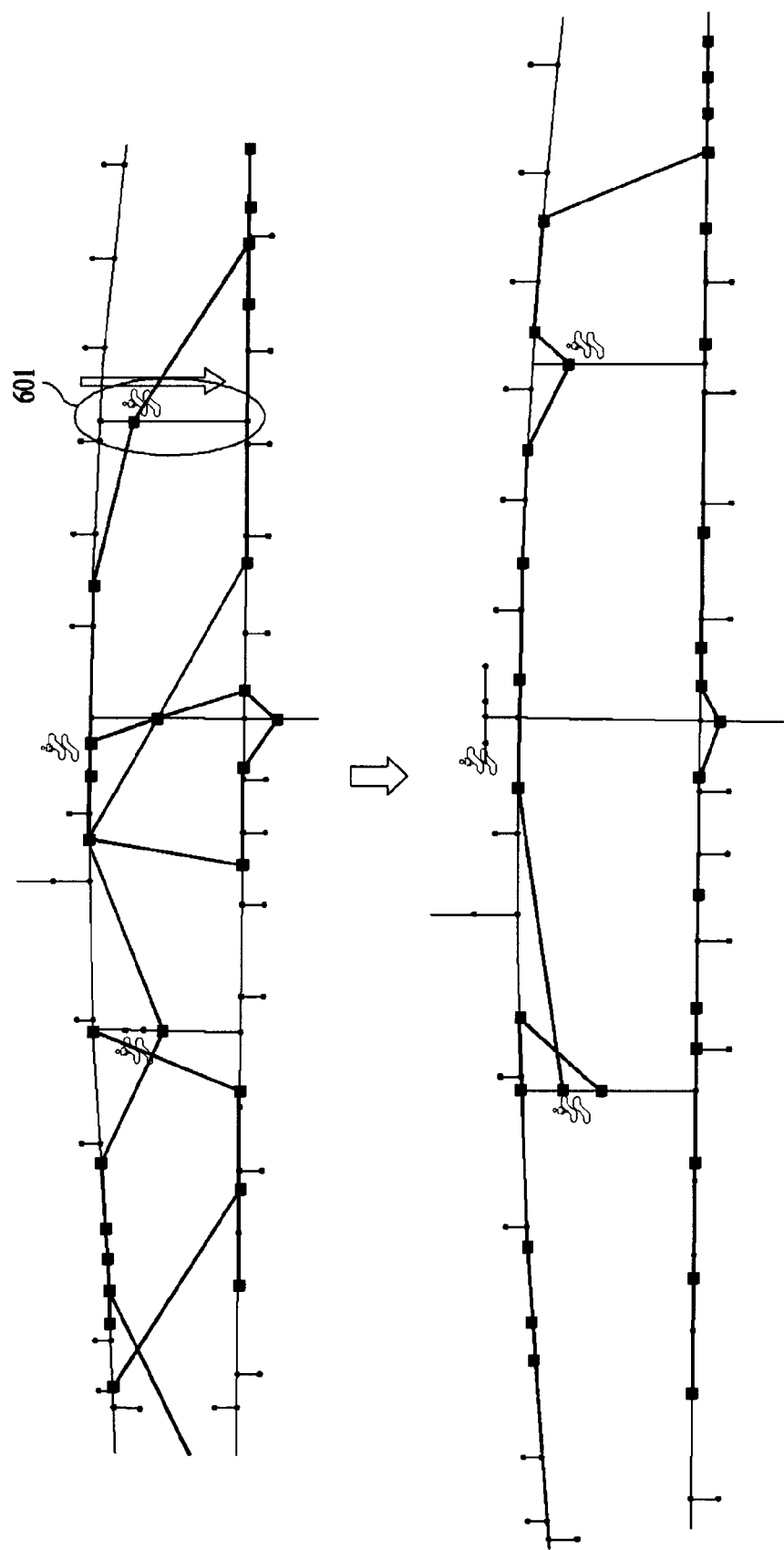
FIG. 6 illustrates a diagram illustrating an operation of determining the current location of a user terminal moving on an escalator according to an example embodiment.

FIG. 6 illustrates an example of describing an operation of determining the current location of the user terminal 101 in response to moving on an escalator according to an example embodiment.

An AP may not be installed on an escalator, stairs, and the like. The user terminal 101 may move between floors inside a building using the escalator, stairs, or the like. If the user terminal 101 moves between floors using an escalator 601, stairs, etc., information about a floor that the user terminal has entered among floors inside a building may significantly differ from information about a previously positioned floor. For example, if location information of the user terminal 101 just previously positioned relates to a 2nd floor and floor information of each of FPs included in a candidate list relates to a preset floor reference value, for example, the 2nd floor, or more, the location determiner 213 may determine the just-previously positioned location information of the user terminal as the current location of the user terminal. That is, if floor information significantly differs, the location determiner 213 may determine that the user terminal 101 is moving on an escalator, stairs, etc., or is located in a shadowed area in which indoor positioning is difficult, and may determine the previously positioned location information, for example, the location of the user terminal 101 positioned on the 2nd floor, as the current location of the user terminal. The previously positioned location information (2nd floor) may be displayed on the screen of the user terminal 101 until the user terminal enters a new floor through an escalator, stairs, etc., and then, new floor information is received.

Figure 7:
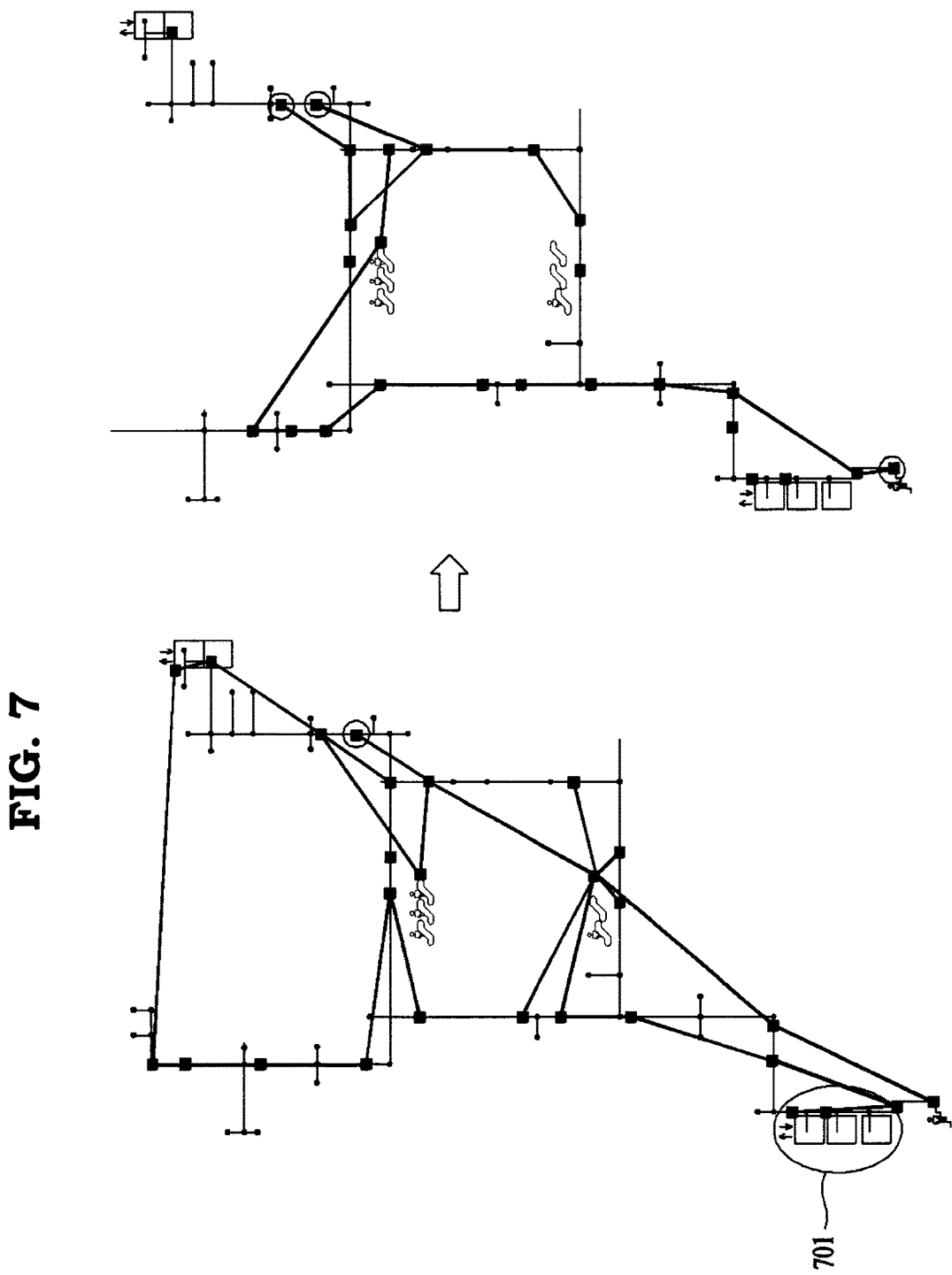
FIG. 7 illustrates a diagram illustrating an operation of determining the current location of a user terminal moving on an elevator inside a building according to an example embodiment.

FIG. 7 illustrates an example of describing an operation of determining the current location of the user terminal 101 in response to moving on an elevator inside a building according to an example embodiment.

Referring to FIG. 7, if the user terminal 101 is moving from a 2nd floor to a 5th floor on an elevator as indicated with a circle 701, FPs corresponding to information about four different floors, for example, the 2nd floor, the 3rd floor, the 4th floor, and the 5th floor, may be included in a candidate list. If floor information of each of FPs included in the candidate list includes a variety of floor information greater than or equal to a preset threshold, the location determiner 213 may determine the current location of the user terminal 101 as the previously positioned location information. That is, the previously positioned location information, for example, location information last positioned on the 2nd floor, may be displayed as the current location on the screen of the user terminal 101. As described above, if the user terminal 101 is moving using an elevator, escalator, stairs, etc., the previously positioned location information may be provided as the current location of the user terminal, thereby reducing a floor change count, which iteratively varies like playing ping pongs.

Figure 8:
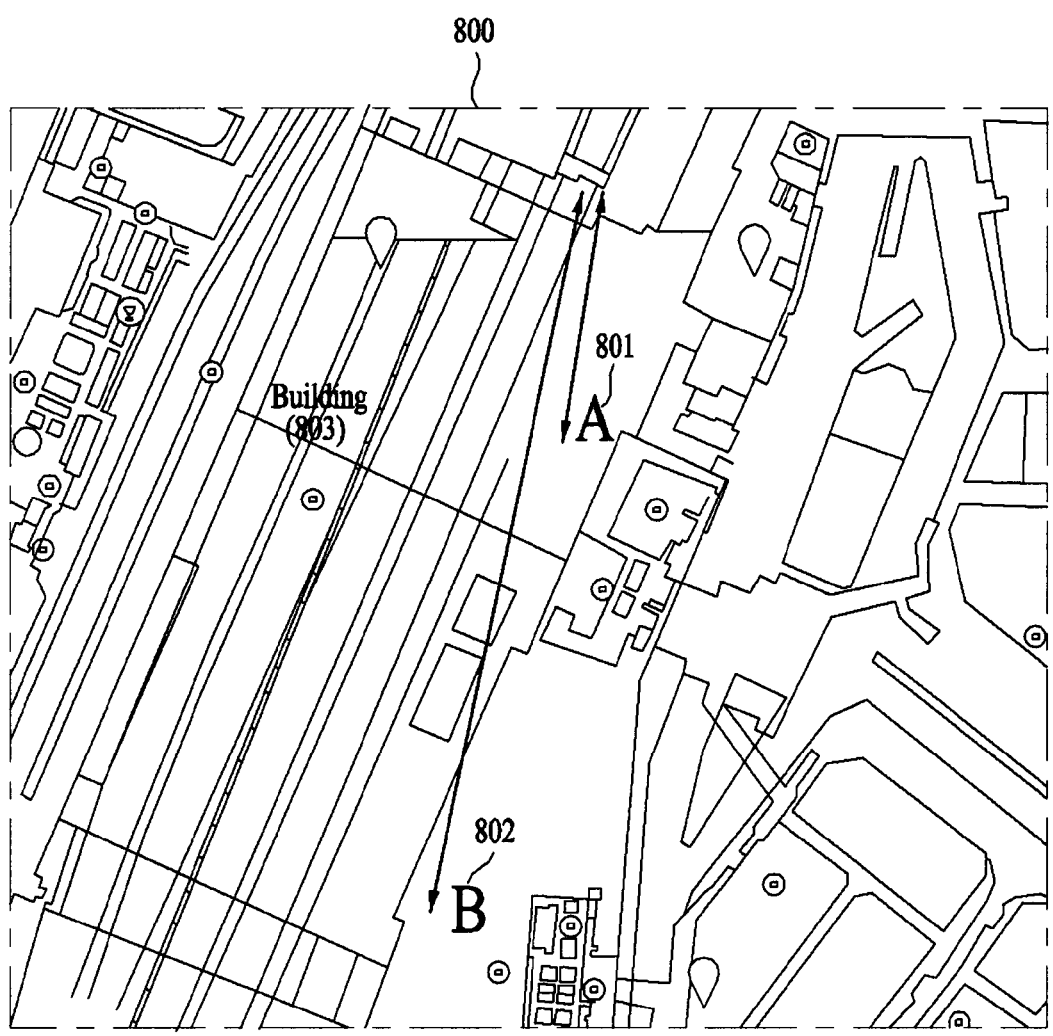
FIG. 8 illustrates a diagram illustrating an operation of determining the current location of a user terminal moving from inside a building to the outside according to an example embodiment.

FIG. 8 illustrates an example of describing an operation of determining the current location of the user terminal 101 in response to the user terminal moving from inside a building to the outside according to an example embodiment.

FIG. 8 illustrates a map 800 showing a building 803 in which the user terminal 101 has been located before moving to a region B 802 and surroundings of the building 803.

Referring to FIG. 8, if the outer walls of a building are built with glass, an AP signal inside the building 803 may be received even as the user terminal 101 is outside the building. For example, although the user terminal 101 has moved from a region A 801 inside the building 803 to the region B 802 away from the building by about 100 m or more, an AP signal inside the building 803 may be received at the user terminal. As described above, if the user terminal 101 moves from the region A 801 to the region B 802, the same FP may be determined to be consecutively matched, however, the location accuracy may decrease gradually. Since the current location of the user terminal 101 is determined by excluding the reduced location accuracy, whether the user terminal is located inside the building 803 or outside the building may be further accurately determined.

For example, if the user terminal 101 is located at the region A 801 in time T1, the current location of the user terminal may be determined as the region A 801. When the user terminal 101 is located at the region A 801, the location accuracy of the matching FP1 may be 80. Here, when the user terminal 101 has moved to and is located in the region B 802 in time T2, the current location of the user terminal may be consecutively matched to F1. However, a location accuracy of FP1 matched to the region B 802 may be 20. As described above, if the difference value (70−20=50) of the location accuracy with respect to the consecutive same region is greater than or equal to a preset accuracy upper limit difference value, that is, if the location accuracy of FP1 matched to region B is significantly low and thus, inaccurate, the location determiner 213 may determine that the current location of the user terminal 101 is outdoors. That is, in the related art, regardless of a user terminal having moved to the region B, a current location of the user terminal may be determined to be inside the building. However, by excluding a low location accuracy, the location determiner 213 may determine a location up to the region A 801 as indoors and may recognize a location up to the region B 802 as outdoors. The location determiner 213 may provide an outdoor positioning service using GPS data and the like, or may provide display information, a message, etc., "You are outside the building", "You are outside the coverage of the indoor positioning service", etc., to the user terminal 101. Accordingly, when the user terminal 101 moves from inside the building to the outside, the amount of time used to change the current location to a NONE state may be reduced.

The methods according to the example embodiments may be configured in a form of program instructions executable through a variety of computer systems and may be recorded in a non-transitory computer-readable medium.

The program according to the example embodiments may be configured as a PC-based program or an application exclusive for a mobile terminal. In the example embodiment, the service app, that is, an indoor positioning service application, may be configured in an independently operating program or may be configured in an in-app form of a specific application to be operable on the specific application.

The methods according to the example embodiments may be performed in such a manner that the service app controls the user terminal 101. The application may be installed on the user terminal 101 through a file provided from a file distribution system. For example, the file distribution system may include an installation file manager (not shown) configured to store and manage an installation file and a file transmitter (not shown) configured to transmit the file in response to a request from the user terminal 101.

Figure 9:
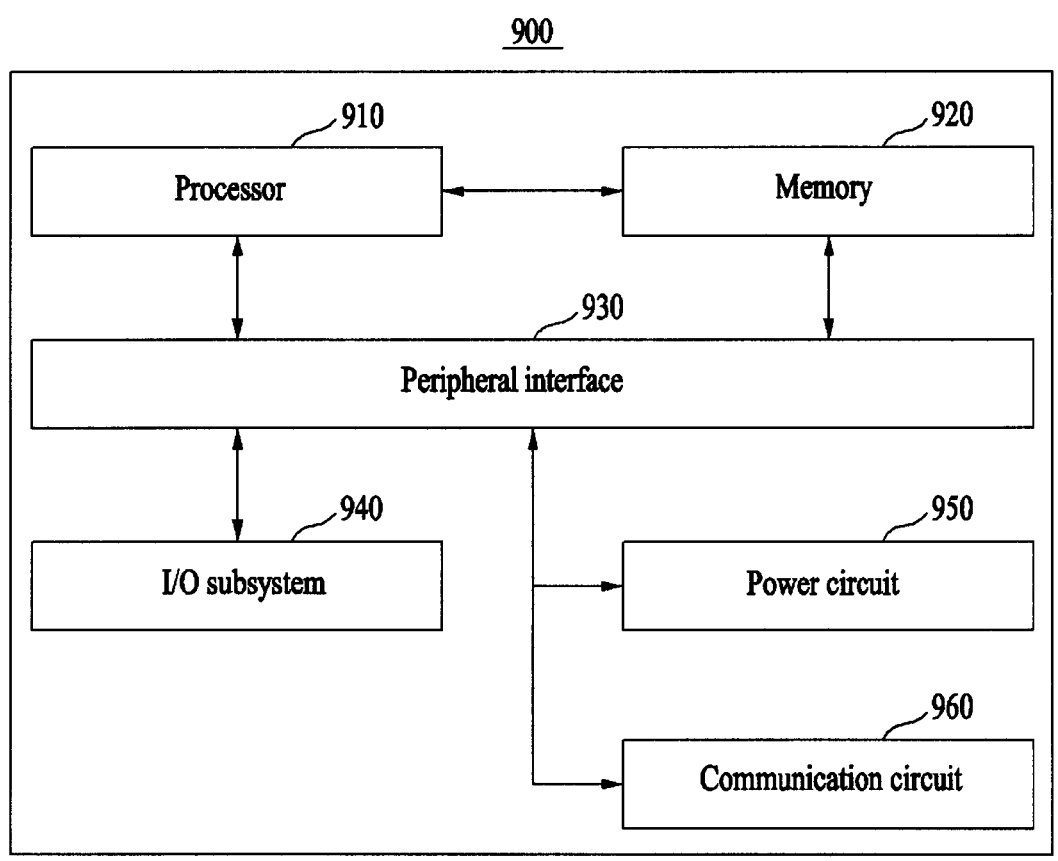
FIG. 9 is a block diagram illustrating an example of a configuration of a computer system according to an example embodiment.

FIG. 9 is a block diagram illustrating an example of a configuration of a computer system according to an example embodiment. Referring to FIG. 9, a computer system 900 may include at least one processor 910, a memory 920, a peripheral interface 930, an input/output (I/O) subsystem 940, a power circuit 950, and a communication circuit 960. The computer system 900 may correspond to the user terminal 101.

The memory 920 may include, for example, a high-speed random access memory (HSRAM), a magnetic disk, a static random access memory (SRAM), a dynamic RAM (DRAM), read only memory (ROM), a flash memory, or a non-volatile memory. The memory 920 may include a software module, an instruction set, or a variety of data required for an operation of the computer system 900. Here, an access from another component such as the processor 910 and the peripheral interface 930 to the memory 920 may be controlled by the processor 910.

The peripheral interface 930 may couple an input device and/or an output device of the computer system 900 with the processor 910 and the memory 920. The processor 910 may perform a variety of functions for the computer system 900 and process data by executing the software module or the instruction set stored in the memory 920.

The I/O subsystem 940 may couple various I/O peripheral devices with the peripheral interface 930. For example, the I/O subsystem 940 may include a controller for coupling the peripheral interface 930 and a peripheral device, such as a monitor, a keyboard, a mouse, a printer, and a touch screen or a sensor depending on a necessity. The I/O peripheral devices may be coupled with the peripheral interface 930 without using the I/O subsystem 940.

The power circuit 950 may supply power to all of or a portion of components of the computer system 900. For example, the power circuit 950 may include a power management system, at least one power source such as a battery and alternating circuit (AC), a charge system, a power failure detection circuit, a power converter or inverter, a power status indicator, or other components for creating, managing and distributing power.

The communication circuit 960 enables communication with another computer system using at least one external port. Alternatively, as described above, the communication circuit 960 may enable communication with another computer system by including a radio frequency (RF) circuit and thereby transmitting and receiving an RF signal known as an electromagnetic signal.

The example embodiment of FIG. 9 is only an example of the computer system 900. The computer system 900 may have a configuration or an arrangement for omitting a portion of the components illustrated in FIG. 9, further including components not illustrated in FIG. 9, or coupling two or more components. For example, a computer system for a communication terminal of a mobile environment may further include a touch screen, a sensor, and the like, in addition to the components of FIG. 9. A circuit for radio frequency (RF) communication using a variety of communication methods, for example, wireless fidelity (WiFi), 3rd generation (3G), long term evolution (LTE), Bluetooth, near field communication (NFC), ZigBee, etc., may be included in the communication circuit 960. Components includable in the computer system 900 may be configured as hardware that includes an integrated circuit specified for at least one signal processing or application, software, or a combination of hardware and software.

The aforementioned indoor positioning service providing method may include reduced number of operations or additional operations based on detailed description made above with reference to FIGS. 1 through 9. Also, at least two operations may be combined and order or locations of operations may be changed.

The methods according to the example embodiments may be configured in a form of a program instruction executable through a variety of computer systems and may be recorded in a non-transitory computer-readable medium.

As described above, according to example embodiments, the current location of the user terminal may be determined by considering a movement distance based on location accuracy and previously positioned location information as well as similarity between candidates. Thus, when performing indoor location positioning while moving in a building with an open ceiling, using an elevator, an escalator, or stairs in which an AP is not installed, a phenomenon (that is, a phenomenon that the current location of the user terminal is not accurately indicated) that a location completely different from an actual location of the user terminal is displayed may be reduced. Also, a phenomenon in which a user terminal located outside a building is displayed to be inside the building may be reduced.

The apparatuses described herein may be implemented using hardware components, software components, and/or a combination thereof. For example, the apparatuses and the components may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The computers may run an operating system (OS) and one or more software applications that run on the OS. The computers also may access, store, manipulate, process, and create data in response to execution of the software. For purpose of simplicity, the description of a computer is used as singular; however, one skilled in the art will appreciate that a computer may include multiple processing elements and/or multiple types of processing elements. For example, a computer may include multiple processors or a processor and a controller. In addition, different processing configurations are possible, such as parallel processors.

The software may include a computer program, a piece of code, an instruction, or some combination thereof, for independently or collectively instructing or configuring the computer to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the example embodiments may be configured in a form of a program instruction executable through a variety of computer systems and recorded in non-transitory computer-readable media including program instructions to implement various operations embodied by a computer. The media may also include, alone or in combination with the program instructions, data files, data structures, and the like. The program instructions stored in the media may be those specially designed and constructed for the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An indoor positioning service providing method, performed by a processor, to determine a current location of a user terminal located inside a building, the method comprising:
   receiving a request for providing an indoor positioning service from the user terminal;
   receiving information about adjacent wireless access points of the user terminal in response to the request;
   calculating a similarity between information and another piece of information, and a location accuracy of a wireless access point based on the received information about the adjacent wireless access points of the user terminal and information about adjacent wireless access points collected from each of a plurality of virtual regions disposed inside the building; and
   determining the current location of the user terminal based on the similarity between information and another piece of information, and the location accuracy;
   wherein the calculating comprises:
   determining a wireless access point that matches a media access control (MAC) address of an adjacent wireless access point of the user terminal, with respect to information about the adjacent wireless access points collected from each region; and
   calculating the location accuracy for each corresponding, region based on at least one of a number of adjacent wireless access points collected from each corresponding virtual region and a number of the matching wireless access points, with respect to a virtual region corresponding to the wireless access point that matches the MAC address.

2. The method of claim 1, wherein the calculating comprises calculating a movement distance for each of the plurality of virtual regions based on coordinate information associated with a previous location of the user terminal and coordinate information of each of the plurality of virtual regions, and
   the determining of the current location of the user terminal comprises determining the current location based on the similarity between information and another piece of information, the location accuracy, and the movement distance.

3. The method of claim 1, wherein the similarity between information and another piece of information is calculated between a signal strength of an adjacent wireless access point collected from each virtual region and a signal strength of an adjacent wireless access point of the user terminal based on a MAC address of each of the adjacent wireless access points collected from each virtual region and the adjacent wireless access points of the user terminal; and the location accuracy is calculated based on a reference similarity and the similarity between information and another piece of information, the reference similarity indicating a time at which the user terminal is located at each of the plurality of virtual regions and being preset for each virtual region.

4. The method of claim 1, wherein the determining comprises determining the current location of the user as a previously positioned location based on the location accuracy and a preset reference accuracy.

5. The method of claim 1, wherein the determining comprises determining the current location of the user terminal as a previously positioned location, in response to each virtual region belonging to a different floor based on coordinate information of each virtual region included in a candidate list, with respect to the candidate list that is generated based on the MAC address of each of the adjacent wireless access points collected from each of the plurality of virtual regions and the adjacent wireless access points of the user terminal.

6. The method of claim 1, wherein the determining comprises determining the current location of the user terminal by excluding a wireless access point having the location accuracy greater than or equal to a preset reference value in response to a continuous matching between the current location of the user terminal and a previously positioned location.

7. The method of claim 1, further comprising:
   providing at least one of a location-based tracking service and a find-way service based on the current location of the user terminal.

8. The method of claim 1, wherein each of the plurality of virtual regions indicates a fingerprint point virtually disposed at the same preset interval inside the building.

9. An indoor positioning service providing system to determine a current location of a user terminal located inside a building, the system comprising:
   an information receiver configured to receive information about adjacent wireless access points of the user terminal, in response to receiving a request for providing an indoor positioning service from the user terminal;
   a calculator configured to calculate a similarity between information and another piece of information, and a location accuracy of a wireless access point based on the received information about the adjacent wireless access points of the user terminal and information about adjacent wireless access points collected from each of a plurality of virtual regions disposed at same preset intervals inside the building; and
   a location determiner configured to determine the current location of the user terminal based on the similarity between information and another piece of information and the location accuracy;
   wherein the calculator is configured to determine a wireless access point that matches a media access control (MAC) address of an adjacent wireless access point of the user terminal, with respect to information about the adjacent wireless access points collected from each virtual region, and to calculate the location accuracy for each corresponding virtual region based on at least one of a number of adjacent wireless access points collected from each corresponding virtual region and a number of the matching wireless access points, with respect to a virtual region corresponding to the wireless access point that matches the MAC address.

10. The system of claim 9, wherein the calculator is configured to calculate a movement distance for each of the plurality of virtual regions based on coordinate information associated with a previous location of the user terminal and coordinate information of each of the plurality of virtual regions, and the location determiner is configured to determine the current location based on the similarity between information and another piece of information, the location accuracy, and the movement distance.

11. The system of claim 9, wherein the similarity between information and another piece of information is calculated between a signal strength of an adjacent wireless access point collected from each virtual and a signal strength of an adjacent wireless access point of the user terminal based on the MAC address of each of the adjacent wireless access points collected from each virtual region and the adjacent wireless access points of the user terminal, and the location accuracy is calculated based on a reference similarity and the similarity between the signal strengths, the reference similarity indicating a time at which the user terminal is located at each of the plurality of virtual regions and being preset for each virtual region.

12. The system of claim 9, wherein the location determiner is configured to determine the current location of the user as a previously positioned location based on the location accuracy and a preset reference accuracy.

13. The system of claim 9, further comprising:
a service provider configured to provide at least one of a location-based tracking service and a find-way service based on the current location of the user terminal.

14. A non-transitory computer-readable medium storing instructions to control a computer system to provide an indoor positioning service, wherein the instructions control the computer system to execute the steps comprising:
receiving a request for providing an indoor positioning service from the user terminal;
receiving information about adjacent wireless access points of the user terminal in response to the request;
calculating a similarity between information and another piece of information, and a location accuracy of a wireless access point based on the received information about the adjacent wireless access points of the user terminal and information about adjacent wireless access points collected from each of a plurality of virtual regions disposed at same preset intervals inside the building; and
determining the current location of the user terminal based on the similarity between information and another piece of information, and the location accuracy;

wherein the calculating comprises:
determining a wireless access point that matches a media access control (MAC) address of an adjacent wireless access point of the user terminal, with respect to information about the adjacent wireless access points collected from each virtual region; and
calculating the location accuracy for each corresponding virtual region based on at least one of a number of adjacent wireless access points collected from each corresponding virtual region and a number of the matching wireless access points, with respect to a virtual region corresponding to the wireless access point that matches the MAC address.

15. A file distribution system to distribute an installation file for installing on a user terminal an application for determining a current location of the user terminal located inside a building, the system comprising:
an installation file manager configured to store and manage the installation file; and
an installation file transmitter configured to transmit the installation file to the user terminal in response to a request from the user terminal,
wherein the application controls the user terminal to receive a current location of the user terminal inside a building based on a similarity between information and another piece of information and a location accuracy, which are calculated by determining a wireless access point that matches a media access control (MAC) address of an adjacent wireless access point of the user terminal, with respect to information about the adjacent wireless access points collected from each virtual region; and calculating the location accuracy for each corresponding virtual region based on at least one of a number of adjacent wireless access points collected from each corresponding virtual region and a number of the matching wireless access points, with respect to a virtual region corresponding to the wireless access point that matches the MAC address.

16. The file distribution system of claim 15, wherein the application controls the user terminal to calculate a movement distance for each virtual region based on coordinate information associated with a previous location of the user terminal and coordinate information of each of the plurality of virtual regions, and to receive the current location of the user terminal that is determined based on the similarity between information and another piece of information, the location accuracy, and the movement distance.

* * * * *